US008559285B2

(12) United States Patent  
Imagawa

(10) Patent No.: US 8,559,285 B2  
(45) Date of Patent: Oct. 15, 2013

(54) OPTICAL DISC APPARATUS

(75) Inventor: Seiji Imagawa, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/565,831

(22) Filed: Aug. 3, 2012

(65) Prior Publication Data

US 2013/0064058 A1 Mar. 14, 2013

(30) Foreign Application Priority Data

Sep. 9, 2011 (JP) ................................. 2011-196674

(51) Int. Cl.
G11B 7/00 (2006.01)

(52) U.S. Cl.
USPC ...................................... 369/53.15; 369/44.29

(58) Field of Classification Search
None
See application file for complete search history.

(56) References Cited

U.S. PATENT DOCUMENTS

| 4,731,771 | A  | * | 3/1988  | Maeda et al.      | 369/44.25 |
|-----------|----|---|---------|-------------------|-----------|
| 5,331,615 | A  | * | 7/1994  | Yamada et al.     | 369/44.32 |
| 6,285,635 | B1 | * | 9/2001  | Watanabe et al.   | 369/44.27 |
| 6,388,963 | B1 | * | 5/2002  | Tanaka            | 369/44.26 |
| 6,442,114 | B1 | * | 8/2002  | Ishibashi et al.  | 369/47.17 |
| 6,580,669 | B1 | * | 6/2003  | Graba et al.      | 369/44.41 |
| 7,876,654 | B2 | * | 1/2011  | Tada              | 369/47.49 |
| 2002/0044506 | A1 | * | 4/2002  | Shihara et al.    | 369/44.32 |
| 2003/0043706 | A1 | * | 3/2003  | Nakata et al.     | 369/44.13 |
| 2003/0058768 | A1 | * | 3/2003  | Yokoyama          | 369/53.18 |
| 2003/0193855 | A1 | * | 10/2003 | Yoshioka et al.   | 369/44.32 |
| 2004/0013056 | A1 | * | 1/2004  | Ando              | 369/44.29 |
| 2004/0136300 | A1 | * | 7/2004  | Mouri et al.      | 369/53.33 |
| 2005/0024998 | A1 | * | 2/2005  | Inoue et al.      | 369/44.29 |
| 2005/0169146 | A1 | * | 8/2005  | Nirei             | 369/53.35 |
| 2005/0185550 | A1 | * | 8/2005  | Yamaguchi et al.  | 369/53.15 |
| 2007/0147206 | A1 | * | 6/2007  | Tada              | 369/53.23 |
| 2007/0273997 | A1 | * | 11/2007 | Olson             | 360/69    |
| 2008/0068941 | A1 | * | 3/2008  | Shin et al.       | 369/44.32 |
| 2008/0165648 | A1 | * | 7/2008  | Jeong et al.      | 369/53.17 |
| 2012/0092976 | A1 | * | 4/2012  | Urakawa           | 369/44.14 |
| 2012/0224464 | A1 | * | 9/2012  | Kim               | 369/47.4  |

FOREIGN PATENT DOCUMENTS

| JP | 01245475 A | * | 9/1989 |
| JP | 2002-42354 |   | 2/2002 |
| JP | 2006331495 A | * | 12/2006 |

* cited by examiner

*Primary Examiner* — Peter Vincent Agustin
(74) *Attorney, Agent, or Firm* — Antonelli, Terry, Stout & Kraus, LLP.

(57) ABSTRACT

An optical disc apparatus includes a focus controller including a first digital filter, tracking controller including a second filter, focus actuator driver, tracking actuator driver, defect detector for detecting a defect on an optical disc, and a system controller for controlling the focus controller, the tracking controller and the defect detector. The system controller holds an input and output of at least one of either the focus controller or the tracking controller on the basis of the output of the defect detector, and sets an initial value in a delay memory of the digital filter of the controller held upon awake of the hold state.

13 Claims, 9 Drawing Sheets

OPTICAL DISC APPARATUS

INCORPORATION BY REFERENCE

The present application claims priority from Japanese application JP2011-196674 filed on Sep. 9, 2011, the content of which is hereby incorporated by reference into this application.

BACKGROUND OF THE INVENTION

The present invention relates to an optical disc apparatus which performs recording and reproducing operation over information by irradiating a disc with a laser beam.

With respect to control relating to defect detection in an optical disc apparatus, JP-A-2002-42354, for example, states that "the apparatus includes a holding module for putting a servo circuit in its holding state according to a prediction of a defect time predicting module when a defect detection circuit detects a defect, and also for putting the servo circuit in the holding state during the detection of the defect with the defect detection circuit".

SUMMARY OF THE INVENTION

When optical spot passed over a defect part such as a flaw or dust on a disc, a servo error signal such as a tracking error signal or a focus error signal may fail, in some cases, to correctly indicate a relative position of the optical spot to a recording surface or a track on the disc. When a feedback control is carried out with use of such an error signal, this undesirably causes to increase the error. An error in the position of the optical spot caused during the passage of the defect part of the optical spot can be reduced by putting the servo circuit in its holding state during the passage of the optical spot over the defect part, as in JP-A-2002-42354.

However, an offset included in a drive circuit or a distortion in the disc may cause, in some cases, more or less an error in the optical spot. In order to improve the control performance over a defect in the optical disc apparatus, it becomes necessary not only to employ the method of reducing the error during the defect passage but also to reduce the error caused during the defect passage in a shorter time after the defect passage.

An object of the present invention is to provide an optical disc apparatus which can perform reliable actuator control by reducing such control error as the tracking error or the focus error after defect passage stably and in a short time.

In accordance with the present invention, the aforementioned problem is eliminated by employing such an arrangement as recited in the claims as an example.

According to the present invention, such reliable actuator control can be achieved so as to reduce the influences of the defects.

Other objects, features and advantages of the invention will become apparent from the following description of the embodiments of the invention taken in conjunction with the accompanying drawings.

DETAILED DESCRIPTION OF THE EMBODIMENTS

The present invention will be explained in connection with embodiments of the present invention.

Embodiment 1

Figure 1:
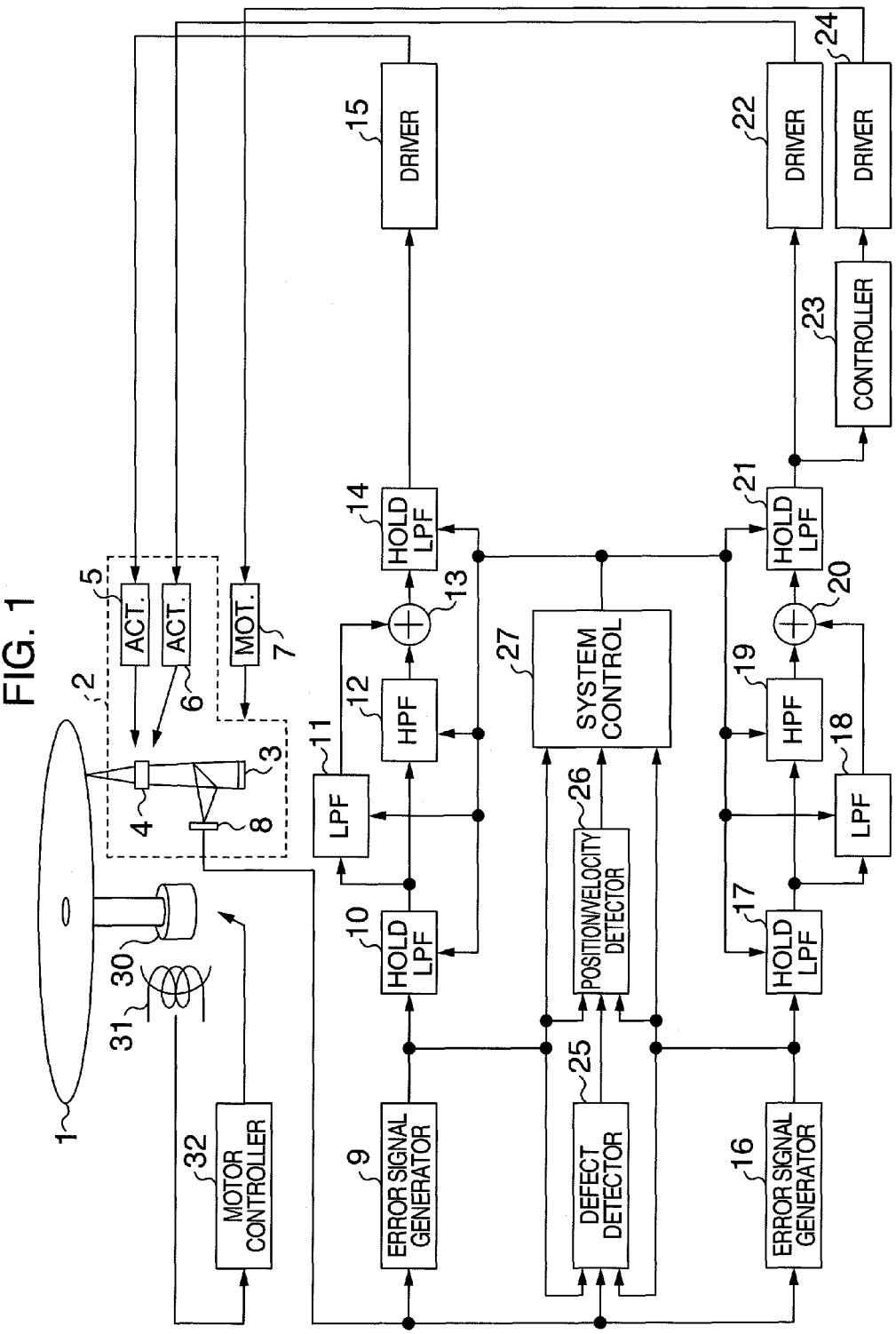
FIG. 1 is a block diagram representing an arrangement of an optical disc apparatus according to an embodiment 1.

FIG. 1 is a block diagram of an arrangement of an optical disc apparatus according to Embodiment 1. In FIG. 1, reference numeral 1 denotes a disc, numeral 2 denotes an optical pickup unit, 3 a laser diode, 4 an objective lens, 5 a focus actuator, 6 a tracking actuator, 7 a pickup feeding motor, 8 a detector, 9 a focus error signal generating module, 10 a holding module, 11 an LPF (low-pass filter) for low frequency component compensation, 12 a HPF for phase compensation, 13 an adder, 14 a holding module, 15 a focus actuator driving module, 16 a tracking error signal generating module, 17 a holding module, 18 an LPF for low frequency component compensation, 19 an HPF for phase compensation, 20 an adder, 21 a holding module, 22 a tracking actuator driving module, 23 a feed motor control module, 24 a feed motor driving module, 25 a defect detecting module, 26 a position/velocity detecting module, 27 a system controller, 30 a spindle motor for rotating the disc, 31 a frequency generating module for generating a signal according to a rotational velocity of the spindle motor, and 32 a motor control module for controlling the spindle motor to be rotated at a predetermined velocity.

Explanation will then be made as to schematic operation of each functional block and as to relationships among the blocks. In FIG. 1, the laser diode 3 outputs a laser beam, which in turn passes through the objective lens 4 and then focused on a recording/reproducing layer in the disc 1. Part of the laser beam reflected by the recording/reproducing layer passes through the objective lens 4 and then received at the detector 8. The focus actuator 5 moves the objective lens 4 toward the rotary shaft of the disc, meanwhile, the tracking actuator 6 moves the objective lens 4 in a disc radius direction. The pickup feeding motor 7 moves the optical pickup unit 2 in the disc radius direction. The detector 8 converts the reflected beam to an electric signal, and the converted signal is sent to the focus error signal generating module 9 and also to the tracking error signal generating module 16.

The focus error signal generating module 9 generates a focus error signal on the basis of the received signal, and sends the generated signal to the holding module 10, the defect detecting module 25, the position/velocity detecting modules 26 and the system controller 27. The holding module 10 sends either a through output or a holding signal after removal of a high frequency component of the input signal to the LPF 11 for low frequency compensation and to the HPF 12 for phase compensation, on the basis of an output of the system controller. The LPF 11 and the HPF 12 convert their input signals, and supply their converted signals to the adder 13. The adder 13 adds signals supplied from the LPF 11 and the HPF 12, and sends the added signal to the holding module 14. The holding module 14 sends either a through output or a holding signal after removal of a high frequency component of an input signal on the basis of the output of the system controller, to the focus actuator driving module 15. The focus actuator driving module 15 drives the focus actuator 5 on the basis of the received signal.

The tracking error signal generating module 16 generates a tracking error signal on the basis of the received signal, and sends the generated signal to the holding module 17, the defect detecting module 25, the position/velocity detecting module 26 and the system controller 27. The holding module 17 sends either a through output or the holding signal after removal of a high frequency component of the input signal on the basis of the output of the system controller to the LPF 18 of low frequency component compensation and the HPF 19 for phase compensation. The LPF 18 of low frequency component compensation and the HPF 19 for phase compensation convert their input signals, and sends the converted signals to the adder 20. The adder 20 adds together signals sent from the LPF 18 and the HPF 19, and sends the added signal to the holding module 21. The holding module 21 sends either a through output or a holding signal after removal of a high frequency component of the input signal to the tracking actuator driving module 22 and to the feed motor control module 23 on the basis of the output of the system controller. The tracking actuator driving module 22 drives the tracking actuator 6 on the basis of the received signal.

The feed motor control module 23 generates an optical pickup feeding signal on the basis of an output of the holding module 21, and sends the generated signal to the feed motor driving module 24. The feed motor driving module 24 drives the pickup feeding motor 7 on the basis of the received signal.

Figure 4:
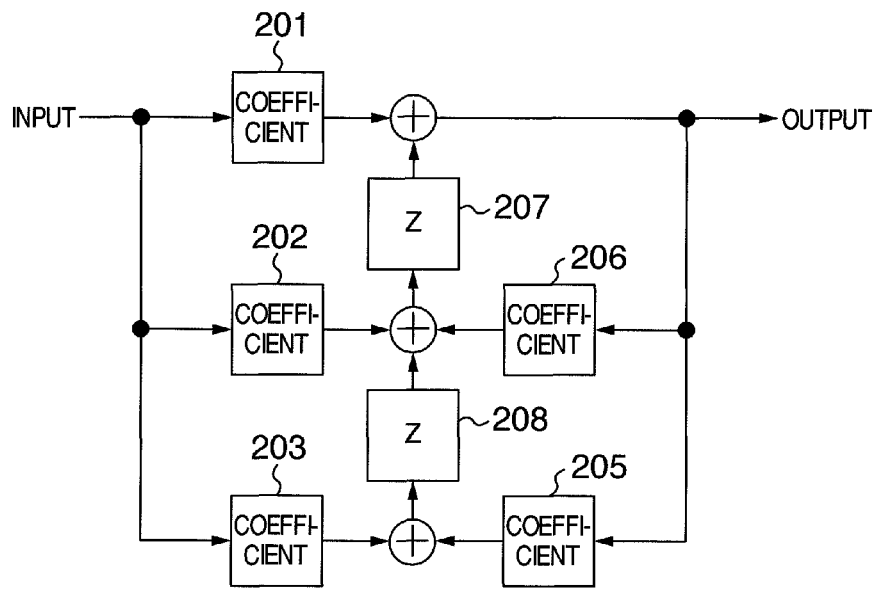
FIG. 4 is a diagram for explaining a schematic arrangement of a phase interpolating HPF (high pass filter) in the present invention.

The defect detecting module 25 generates a defect signal on the basis of signals received from the detector 8, the focus error signal generating module 9 and the tracking error signal generating module 16, and then sends the generated signal to the position/velocity detecting module 26. The position/velocity detecting module 26 calculates information on position and velocity of the optical spot immediately after passage of the optical spot over a defect on the basis of signals received from the defect detecting module 25, the focus error signal generating module 9 and the tracking error signal generating module 16; and then sends the calculated value and the defect signal to the system controller 27. The system controller 27 sends control signals to the holding module 10, the holding module 14, the holding module 17 and the holding module 21 on the basis of the defect signal for their holding operation control. The system controller awakes the holding operation of each holding module after the defect passage, calculates initial values of the LPF 18 for phase compensation and the HPF 19 for phase compensation on the basis of positional and velocity information received from the position/velocity detecting module 26, and set the calculated initial values. Simultaneously, the system controller sets the initial values of the LPF 11 of low frequency component compensation and the LPF 18 of low frequency component compensation as zeroes. In this case, the HPF 12 for phase compensation and the HPF 19 for phase compensation are each an IIR (infinite impulse response) type digital filter as shown in FIG. 4, and the setting of the initial values indicates to input the calculated values in a delay memory 207 and a delay memory 208 as illustrated.

The spindle motor 30 drives the disc 1. The frequency generating module 31 converts information on the rotational velocity of the spindle motor 30 to an electric signal, and sends the converted signal to the motor control module 32. The motor control module 32 controls the spindle motor 30 on the basis of the received signal in such a manner that the disc 1 rotates at a predetermined rotational velocity.

The detailed operations of major ones of the functional blocks will next be explained. The defect detecting module 25 detects a defect on the disc with use of an amplitude of a reproduction signal obtained from the detector 8, a level of a sum signal as a sum of the reflected light, an amplitude of a wobble signal reproduced from the wobbled track on the disc, a rate of change of the focus error signal obtained from the focus error signal generating module 9, and a change rate of the tracking error signal obtained from the tracking error signal generating module 16. The defect signal, when the change rate of the focus error signal and the change rate of the tracking error signal are not used in the defect detection, becomes a signal common to the focus and tracking. Alternatively, the defect signal when the both rates of change of focus and tracking error signals are used, a focus defect signal and a tracking defect signal become mutually independent signals. In this embodiment, the focus defect signal is detected based on the amplitude of the reproduction signal, the level of the sum signal, the amplitude of the wobble signal and the rate change of focus error; whereas, the tracking defect signal is detected based on the amplitude of the reproduction signal, the level of the sum signal, the amplitude of the wobble signal and the change rate of tracking error.

Figure 2:
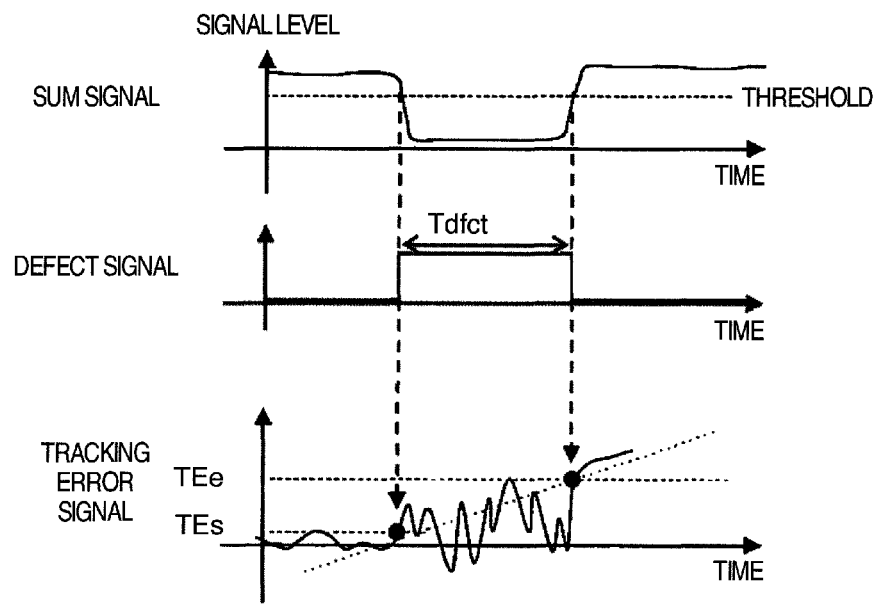
FIG. 2 is a diagram for explaining the operation of a velocity detecting module in the present invention.

The position/velocity detecting module 26, when receiving the focus defect signal and the tracking defect signal from the defect detecting module 25, detects a level FEs of the focus error signal and a level TEs of the tracking error signal at the rise of the defect signal on the basis of the focus error signal and the tracking error signal sent from the focus error signal generating module 9 and from the tracking error signal generating module 16, detects the level FEe of the focus error signal and the level TEe of the tracking error signal at the fall of the defect signal, and further measures a defect period Tdfct. An example of detection of position/velocity of tracking is shown in FIG. 2. The defect detecting module 25 sets the defect signal at a high level Hi when the level of the sum signal becomes equal to or lower than a threshold, and sets the defect signal at a low level Lo when the sum signal level returns to a value equal to or higher than the threshold. The position/velocity detecting module 26 measures a level TEs of the tracking error signal at the rise of the defect signal at a relative position between the optical spot and a corresponding track at the start of passing over the defect, a level TEe of the tracking error signal at the fall of the defect signal at a relative position between the optical spot and corresponding track after the passage of the optical spot over the defect, and the defect period Tdfct; and then calculates a relative velocity Vt between the optical spot and the track after the passage of the defect, using Equation (1) which follows.

$$Vt = (TEe - TEs)/Tdfct \quad \text{Equation (1)}$$

Similarly, the position/velocity detecting module 26 measures a level FEs of the focus error signal at the rise of the defect signal at a relative position between the focus of the optical spot and a recording/reproducing layer at the start of passing over the defect, a level FEe of the focus error signal at the fall of the defect signal at a relative position between the focus of the optical spot and the recording/reproducing layer after the passage of the optical spot over the defect, and a defect period Fdfct; and then calculates a relative velocity Vf between the focus of the optical spot and the recording/reproducing layer after the passage of the defect, using Equation (2) which follows.

$$Vf=(FEe-FEs)/Fdfct \qquad \text{Equation (2)}$$

Using such signal values and defect periods as calculated in this way, the position/velocity detecting module calculates a positional error between a focus control target and a velocity of the optical spot after the passage of the defect, and also calculates a positional error between a tracking control target and the actual optical spot and a velocity of the optical spot after the passage of the defect. In this case, the optical spot during the defect period is assumed to move at a constant velocity. This is because a focus drive signal and a tracking drive signal during the defect period are held at zero or at a minimum value. As another method not based on the above assumption, it is considered to obtain a velocity by detecting changes in the focus error signal and in the tracking error signal for a predetermined period after the end of the defect. However, this causes generation of a delay in the detection time after the defect end.

Figure 3:
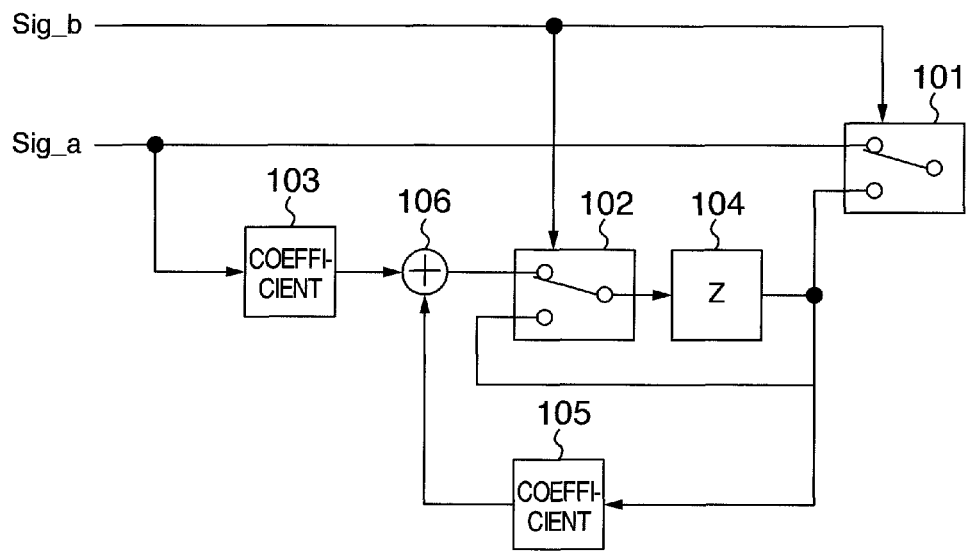
FIG. 3 is a diagram of an arrangement of a holding module.

The system controller 27, on the basis of a defect detection signal received from the defect detecting module 25 via the position/velocity detecting module 26, instructs the holding modules 10, 14, 17 and 21 to perform their holding operation during the defect period. Each of the holding modules is configured with such a digital circuit as shown in FIG. 3. In FIG. 3, the holding module includes switching modules 101 and 102, multiplication modules 103 and 105 for multiplying by a predetermined coefficient, an addition module 106, and a delay memory 104. In the drawing, symbol Sig_a denotes an input signal of each holding module and Sig_b denotes a control signal sent from the system controller 27. During a period of no defect detection, the switching modules 101 and 102 select signals at their upper terminals as illustrated, so that the respective holding module output their input signals directly as they are, and simultaneously, at their lower terminals, the multiplication modules 103 and 105, the addition module 106 and the delay memory 104 configure a digital filter to form an LPF and extract a low frequency component from the input signal. When a defect detection signal is detected, the control signal Sig_b from the system controller 27 causes the switching modules 101 and 102 to select the signals at their lower terminals. This results in that the calculation result of the input signal LPF is held. Since this LPF is designed to extract a low-order component of a signal about the rotational velocity of the disc, it is configured to maintain a low-order component of a signal about surface wobbling or eccentricity or off-center of the disc even when the outputs of the holding module 14 and holding module 21 are held.

The system controller 27 calculates initial values of the HPF 12 for phase compensation and HPF 19 for phase compensation on the basis of the information on position and the velocity of the optical spot sent from the position/velocity detecting module 26. As one of methods of calculating such initial values, there is, for example, a design method of a zero-pole cancellation type, since this design method is designed to cancel poles in a transfer function from the initial value to a control target output each other, a response can be converged to the control target stably and quickly. The system controller, after calculating the initial values, sets the initial values for the HPF 12 for phase compensation and the HPF 19 for phase compensation and also awakes the hold states of the holding module at the same time. In this case, the HPF 12 for phase compensation and the HPF 19 for phase compensation are digital filters of an IIR (Infinite Impulse Response) type, so that the setting of the initial values means to input the calculated values to the illustrated delay memory 207 and delay memory 208. At the same time as the above, the system controller 27 also sets the initial values of the LPF 11 for low frequency component compensation and the LPF 18 for low frequency component compensation at zero.

Figure 5:
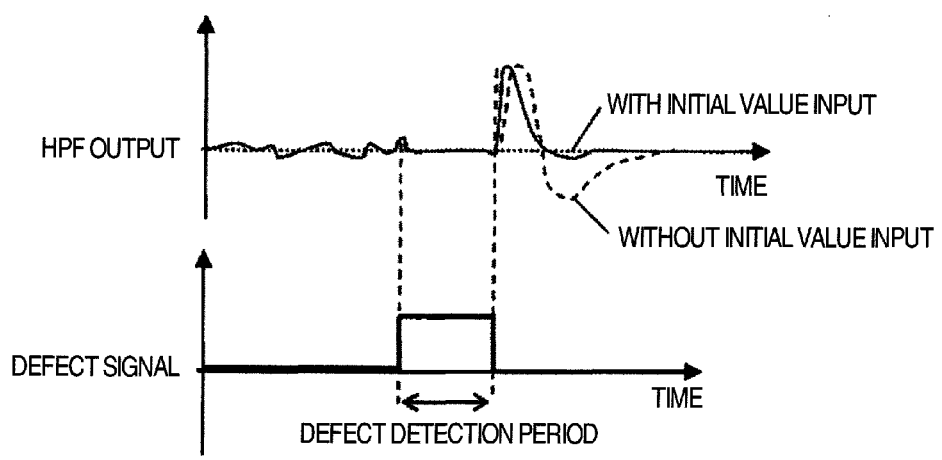
FIG. 5 is a diagram of an exemplary effect of the present invention.

Finally, the effects of the present embodiment will be explained. In a conventional system, the system controller 27 holds each holding module, awakes the hold states thereof at the end of the defect, and closes a feedback control loop. In this case, since the HPF for phase compensation first responds to a relative gap between the hold value and the level of the input signal at the time of hold awake, we cannot necessarily say that the control acts to approach the control target value. And even when the hold value is close to zero, the initial value of the HPF for phase compensation when the feedback control loop is closed cannot necessarily cause achievement of stable response. FIG. 5 diagrammatically shows outputs of the HPF for phase compensation after passage of a defect when initial value input is carried out and when not. When the input of the initial values to the HPF 12 for phase compensation and to the HPF 19 for phase compensation is carried out as in the present embodiment, a stable control loop can be obtained and thus convergence to the control target occurs quickly. In other words, since such a design is made as to cancel poles in the transfer function from the initial value to the control target output each other, the response can be converged to the control target stably and quickly.

Figure 11:
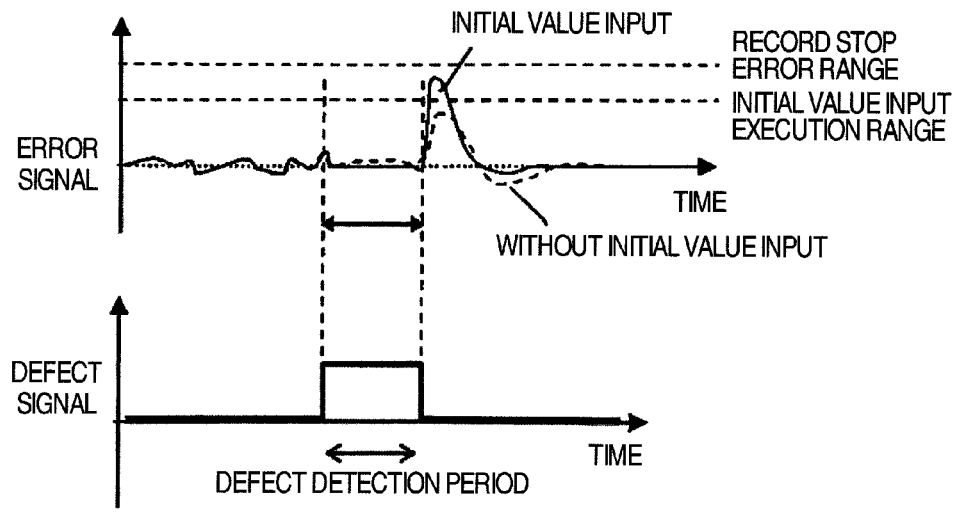
FIG. 11 is a diagram for explaining relationship between a threshold of initial value input operation and a threshold of recording stop in the embodiment 1.

In the present embodiment, the system controller 27 always input initial values to the HPF 12 for phase compensation and to the HPF 19 for phase compensation at the time of generation of a defect. However, the present invention is not limited to the above example. That is, the input of the initial values may be carried out on the basis of the level and/or velocity of the error signal detected after the passage of a defect only when the optical spot is at a position or velocity outside of a predetermined range. At this time, the system controller 27 may have a record stop error range for determining the stoppage of recording operation due to 'out of servo' as shown in FIG. 11, and may set the above predetermined range to be smaller than the record stop error range.

Although the initial values of the HPF 12 for phase compensation and HPF 19 for phase compensation have been calculated on a real time basis from the levels of the error signal after or before the defect in the present embodiment; the present invention is not restricted to this example. That is, initial values for the position and velocity may be previously stored in a not shown memory within the system controller 27, so that the system controller can extract suitable values from the memory on the basis of the detected position and velocity. In this case, the calculation time required for the initial values can be omitted, the initial values can be set more quickly, and thus the response performance to error signals can be improved.

Although a single threshold is set for detecting a defect in the present embodiment, the present invention is not limited to this example. That is, for the purpose of position detection, it is necessary for the error signal level at the end of a defect to be more accurate than the error signal level at the start of the defect. Accordingly, by setting the threshold at the end of the defect as higher than that at the start of the defect, the system controller can detect a suitable error signal level not influenced by the defect.

Further, when it is desired to reduce the influences of the defect on the error signal at the start of the defect, the error signal during a predetermined period using a memory is always stored, and at the time of generation of a defect, the error signal stored in the memory is used retroactively to the past by the predetermined period, and thus the position and velocity can be accurately detected without influenced by the defect.

Although, in the present embodiment, the system controller 27 operates the LPF for low frequency component compensation and the HPF for phase compensation at the same time by awaking the hold state of each holding module, the present invention is not limited to this example. That is, when the HPF for low frequency component compensation and the HPF for phase compensation are arranged in parallel, holding modules being provided at the input stage of the HPF for low frequency component compensation and at the input stage of the HPF for phase compensation independently of each other, and the timing of awaking the hold state of the holding module at the input stage of the HPF for low frequency component compensation being set to be sufficiently later from the fall of the defect signal, the system controller can operate the HPF for low frequency component compensation using an error signal not influenced by the defect. Alternatively, by the HPF for low frequency component compensation and the HPF for phase compensation being arranged in parallel and zero being overwritten on the input/output of the HPF for low frequency component compensation even after the awake of the hold state; effects similar to the above can be obtained.

In the present embodiment, the defect detecting module 25 detects a defect on the disc with the use of the amplitude of the wobble signal, a rate of change in the focus error signal and a rate of change in the tracking error signal. However, the present invention is not limited to this example. That is, in the case where the disc is a disc of a DVD-RAM type having a PID (Physical ID) made in the embossed form, when the defect detecting module 25 detects the PID part of the disc on the basis of a signal sent from the detector 8 and treats the PID in the manner similar to a defect, the defect detecting module can reduce a control follow-up error generated after the passage of the PID. Further, when a control target is changed after the passage of the PID, the defect detecting module can reduce the control follow-up error after the PID passage by adding the change in the control target to the positional information detected by the position/velocity detecting module 26.

Figure 12:
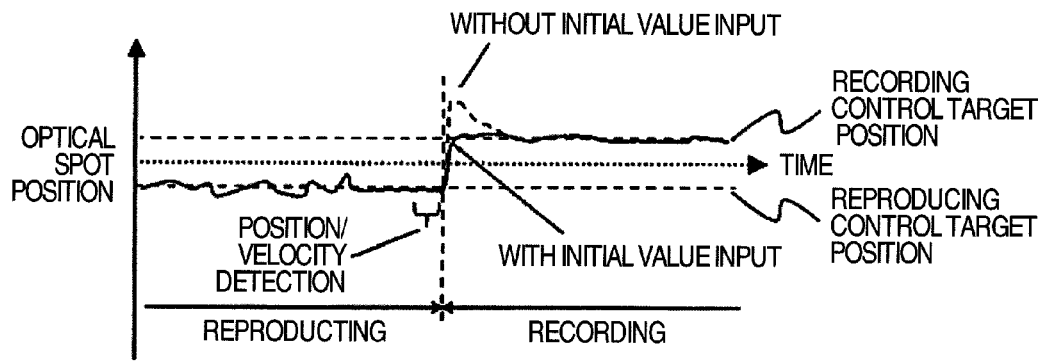
FIG. 12 is a diagram for explaining a trace of an optical spot when control targets are different in recording and reproducing modes in the embodiment 1.

When a control target for the optical spot varies between record mode and reproduction mode as shown in FIG. 12, the control follow-up error after the change of the control target can be reduced by setting an initial value for a compensator upon the change of the control target. At this time, the position of the optical spot is set as the sum of the error signal immediately before the control target change and the change in the control target, and the velocity of the optical spot is set, as its initial value, to be a time change in the error signal immediately before the control target change.

By detecting the position and velocity of the optical spot after the passage of the defect on the basis of the error signals before and after the defect and of the defect period and setting the initial value of the compensator on the basis of the detected values as mentioned above, a control error generated after the defect passage can be reduced stably and quickly and the reliability of apparatus can be improved.

Embodiment 2

Although the initial value to be in the compensator after the defect passage is calculated on the basis of the position and velocity of the optical spot in the above embodiment; similar effects to the above case can be obtained also by previously storing the output of the compensator or the output of the internal calculation when the optical spot passed over the defect and by calculating the initial value on the basis of the stored value.

Figure 6:
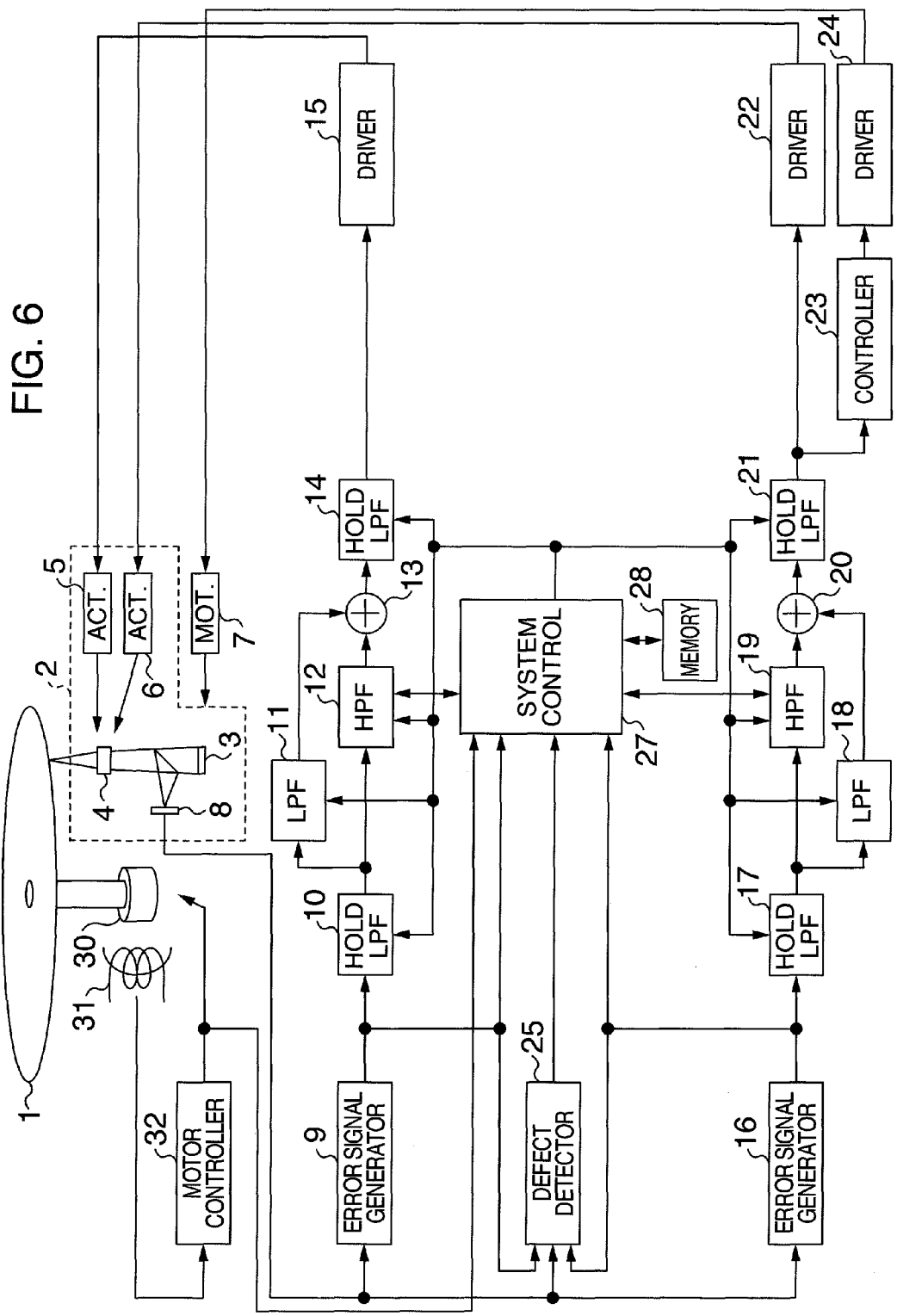
FIG. 6 is a block diagram of an arrangement of an optical disc apparatus according to an embodiment 2.

Explanation will then be made as to the arrangement of an optical disc apparatus in accordance with the present invention with reference to FIG. 6. In FIG. 6, since the blocks 1 to 27 and 30 to 32 are substantially the same as those in the embodiment 1, explanation about such blocks is omitted. In FIG. 6, a reference numeral 28 denotes a memory module.

The operations of the system controller 27 and memory module 28 different from the embodiment 1 will be explained. The system controller 27 receives a defect detection signal from the defect detecting module 25, a focus error signal from the focus error signal generating module 9, and a tracking error signal from the tracking error signal generating module 16. In addition, the system controller 27 further receives information on the rotation and phase of a disc from the motor control module 32. The system controller 27 also can detect the delay memory values of the HPF 12 for phase compensation and HPF 19 for phase compensation.

The defect detecting module 25, when detecting a defect, sends a defect signal to the system controller 27. In a manner similar to the embodiment 1, the system controller 27 instructs the holding modules 10, 14, 17, and 21 to operate holding during the defect period. Next, the system controller 27 detects the focus error signal received from the focus error signal generating module 9 and the level of tracking error signal received from the tracking error signal generating module 16 at the time of end of the defect, and also stores the values of the delay memory for the HPF 12 for phase compensation and HPF 19 for phase compensation in a predetermined period from the end of the defect in the memory module 28. The values stored at this time are stored in association with the rotation/phase information of the disc obtained from the motor control module 32. When the level of the focus error signal or tracking error signal previously detected is equal to or higher than a predetermined value, the system controller calculates initial values of the delay memory for the HPF 12 for phase compensation and HPF 19 for phase compensation on the basis of the values of the delay memory for the HPF 12 for phase compensation and HPF 19 for phase compensation already stored in the memory module 28, and sets the calculated values and awakes the hold state of each holding module at the same time. At the same time as the above, the system controller 27 also sets the initial values of the LPF 11 for low frequency component compensation and LPF 18 for low frequency component compensation at zero.

Figure 7:
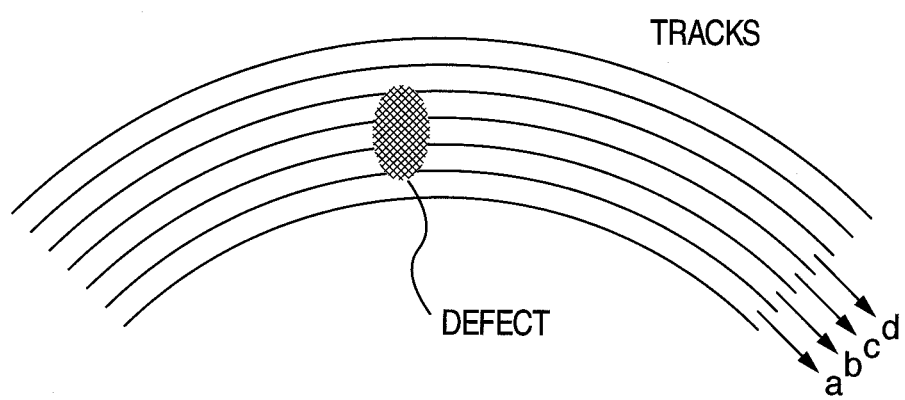
FIG. 7 is a diagram for explaining a relationship between tracks and a defect on a disc.
Figure 8:
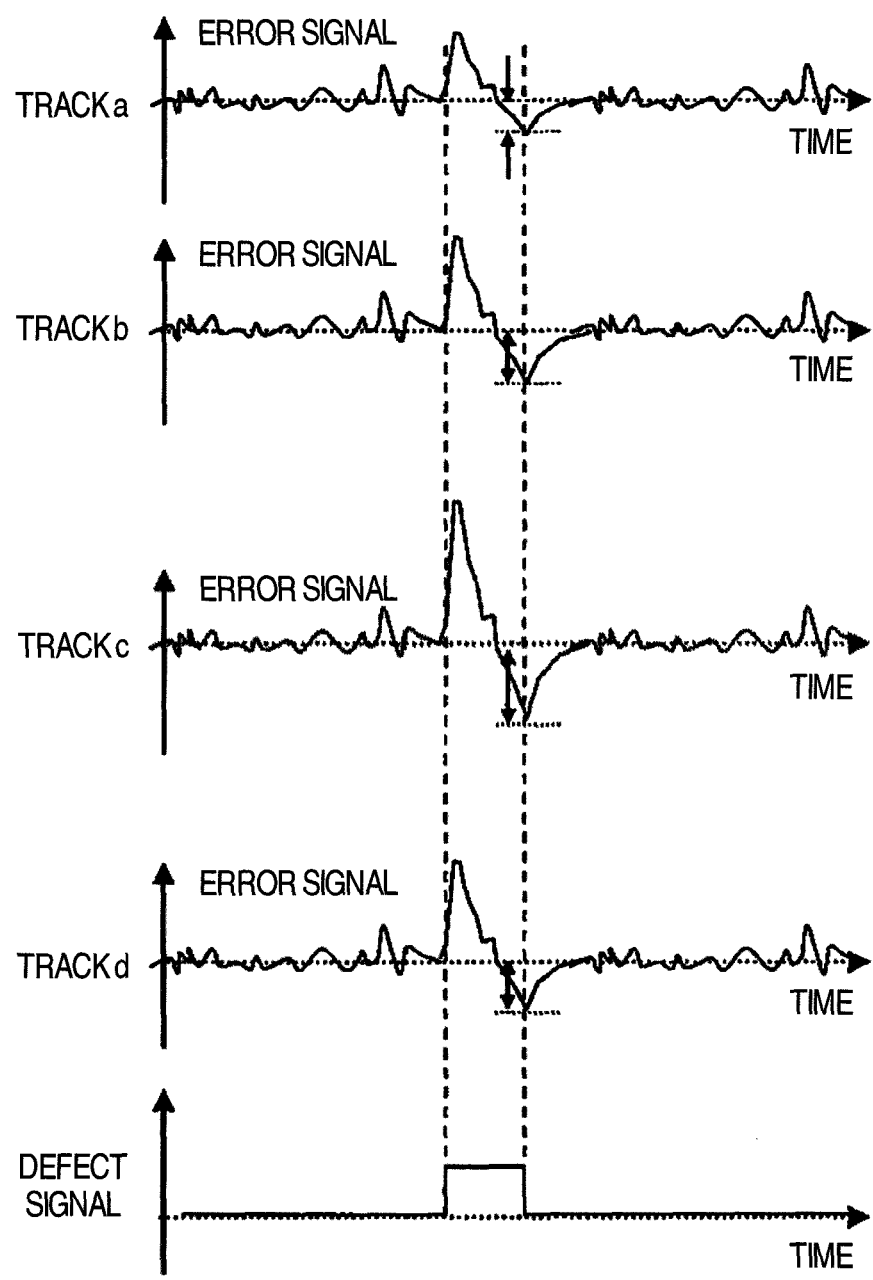
FIG. 8 is a diagram of waveforms of control error signals upon passage of a defect.

The operation of the present embodiment is effective especially when a defect is present extending over a plurality of tracks as in FIG. 7 and it is desired to record or reproduce data continuously in or from the defect area. In FIG. 7, symbols a, b, c and d denote tracks through which the optical spot passes, and FIG. 8 diagrammatically shows error signals when the optical spot passes through defect parts of the tracks. In general, control errors of the adjacent tracks generated by the defect are similar and become gradually large as the optical spot passes through the ends of the defect at the tracks as shown in FIG. 8. In view of this feature, by calculating initial values using the values of the delay memory for the HPF for phase compensation before the level of the error signal after the defect becomes equal to or higher than a predetermined level and by setting the calculated values, the calculation of the initial values based on the position and velocity explained in the embodiment can be omitted. Since the values of the delay memory stored in the memory module 28 is associated with the rotation/phase information of the disc, suitable memory information can be used even when a plurality of defects are present for one turn of the disc.

Although a value obtained by multiplying a predetermined sampled value after the defect passage by a gain is used as the initial value in the present embodiment, similar effects to the above can be obtained even a value obtained by multiplying a maximum value after the defect passage by a gain is used as the initial value.

When there is no information in the memory module 28 upon defect detection, a temporary value previously set in association with the level of the error signal is used as the initial value.

Although the value of the delay memory stored in the memory module 28 is associated with the disc rotation/phase information in the present embodiment, the present invention is not limited to this example. That is, the value of the delay memory may be associated with disc address information to reduce the opportunity of using the temporary initial value.

Embodiment 3

In the above embodiment, the initial value of the compensator is calculated from the values of the delay memory stored in the past, and a temporary initial value is set in the compensator when there is no corresponding value of the delay memory stored in the past. However, when there is no corresponding value in the delay memory stored in the past, the control error generated by the defect passage can be quickly reduced even by calculating a focus position correction pulse or a track position correction pulse on the basis of the position and velocity of the optical spot after the defect passage, which will be explained later.

Figure 9:
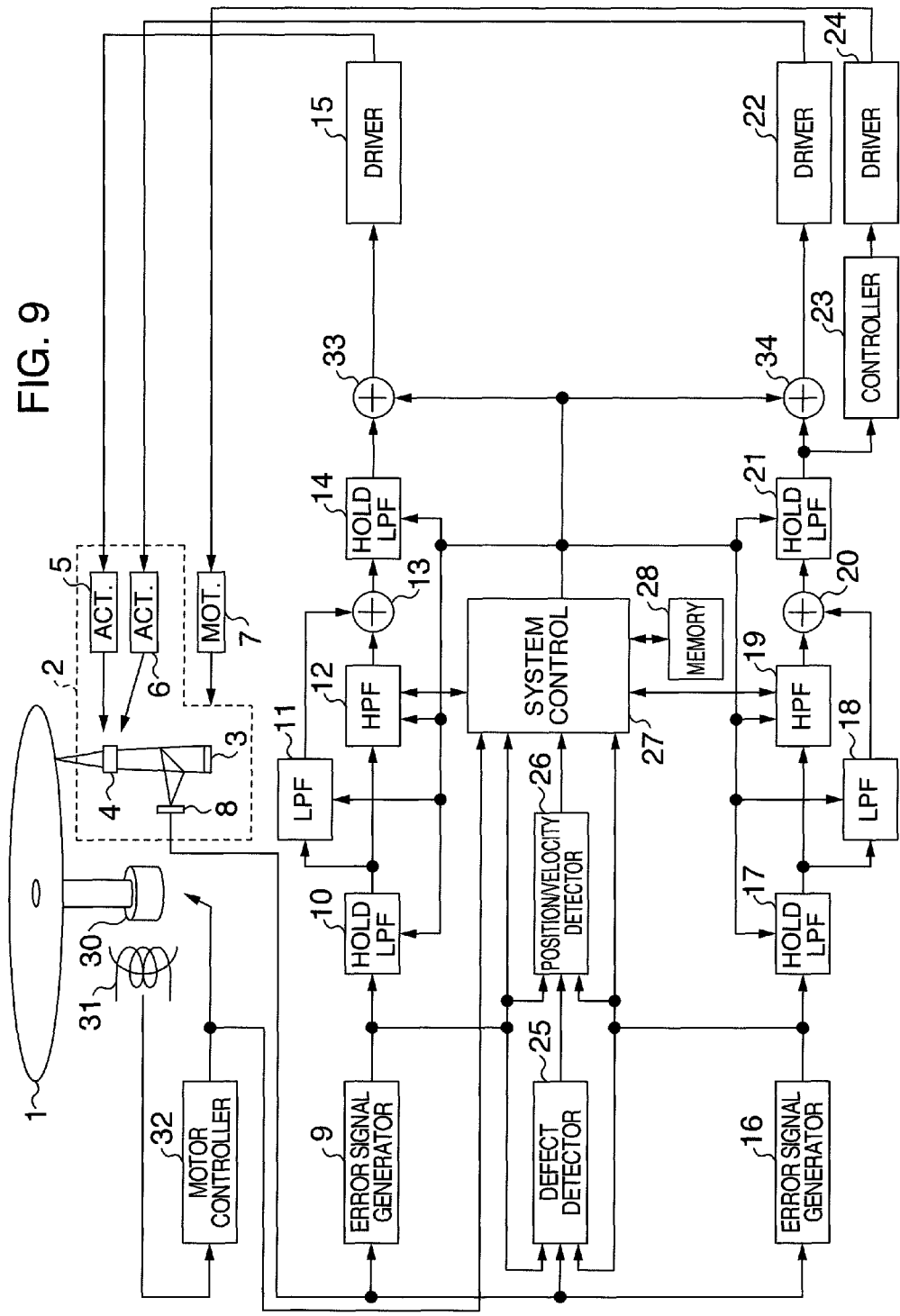
FIG. 9 is a block diagram of an arrangement of an optical disc apparatus according to an embodiment 3.

Explanation will be made as to the arrangement of another optical disc apparatus according to the present invention by using FIG. 9. In the drawing, blocks 1 to 32 are similar to those in the embodiments 1 and 2, and thus explanation thereof is omitted. In FIG. 9, a reference numeral 33 denotes an adder, and a numeral 34 denotes an adder.

Explanation will next be made as to operations of major ones of the blocks different from the embodiments 1 and 2. The system controller 27 receives position and velocity information of an optical spot after passage of a defect and a defect signal from the position/velocity detecting module 26, and also receives a focus error signal and a tracking error signal from the focus error signal generating module 9 and the tracking error signal generating module 16. The system controller 27 also receives rotation/phase information from the motor control module 32. The system controller 27 can detect the values of the delay memory for the HPF 12 for phase compensation and HPF 19 for phase compensation.

Next, the detailed operation of the system controller 27 different from the operations of the embodiments 1 and 2 will be explained. The system controller 27 instructs, in a manner similar to the embodiment 2, the holding modules 10, 14, 17 and 21 to be put in their hold states during the defect period. The system controller then detects a level of a focus error signal received from the focus error signal generating module 9 and a level of a tracking error signal received from the tracking error signal generating module 16 at the timing of the end of the defect, and also stores values of the delay memory for the HPF 12 for phase compensation and HPF 19 for phase compensation in a predetermined period from the defect end in the memory module 28. The values stored at this time are stored in association with the disc rotation/phase information obtained from the motor control module 32. The operation mentioned until now is similar to the operation of the embodiment 2.

The present embodiment operates as follows according to the level of the focus or tracking error signal detected at the defect end. When the signal level is outside of the predetermined range, the system controller awakes the hold state of each holding module and sets the LPF 11 for low frequency component compensation and LPF 18 for low frequency component compensation at zero, and performs no initial value setting for HPF 12 for phase compensation and HPF 19 for phase compensation. When the signal level is outside of the predetermined range, presence of the delay memory value information on the phase compensation HPF obtained by the currently-passed defect in the memory module 28 causes the system controller to calculate initial values for the HPF 12 for phase compensation and HPF 19 for phase compensation using the HPF delay memory value information, and simultaneously sets the calculated values at the same time that the system controller awakes the hold state of each holding module as in the embodiment 2. Simultaneously, the system controller performs zero setting operation for the LPF 11 for the low frequency component compensation and LPF 18 for low frequency component compensation.

When there is no delay memory value information in the memory module 28, on the other hand, the system controller 27 generates a position correction pulse on the basis of the position and velocity information after the defect passage sent from the position/velocity detecting module 26, and sends a focus position correction pulse to the adder 33 and a track position correction pulse to the adder 34. In this case, the position correction pulse is used to move the position of the optical spot to a control target and to calculate a peak value and application time in such a manner that the spot velocity after the spot movement becomes zero. After the output of the position correction pulse ends, the system controller awakes the hold state of each holding module and performs zero setting for the LPF 11 for low frequency component compensation and LPF 18 for low frequency component compensation at the same time.

Figure 10:
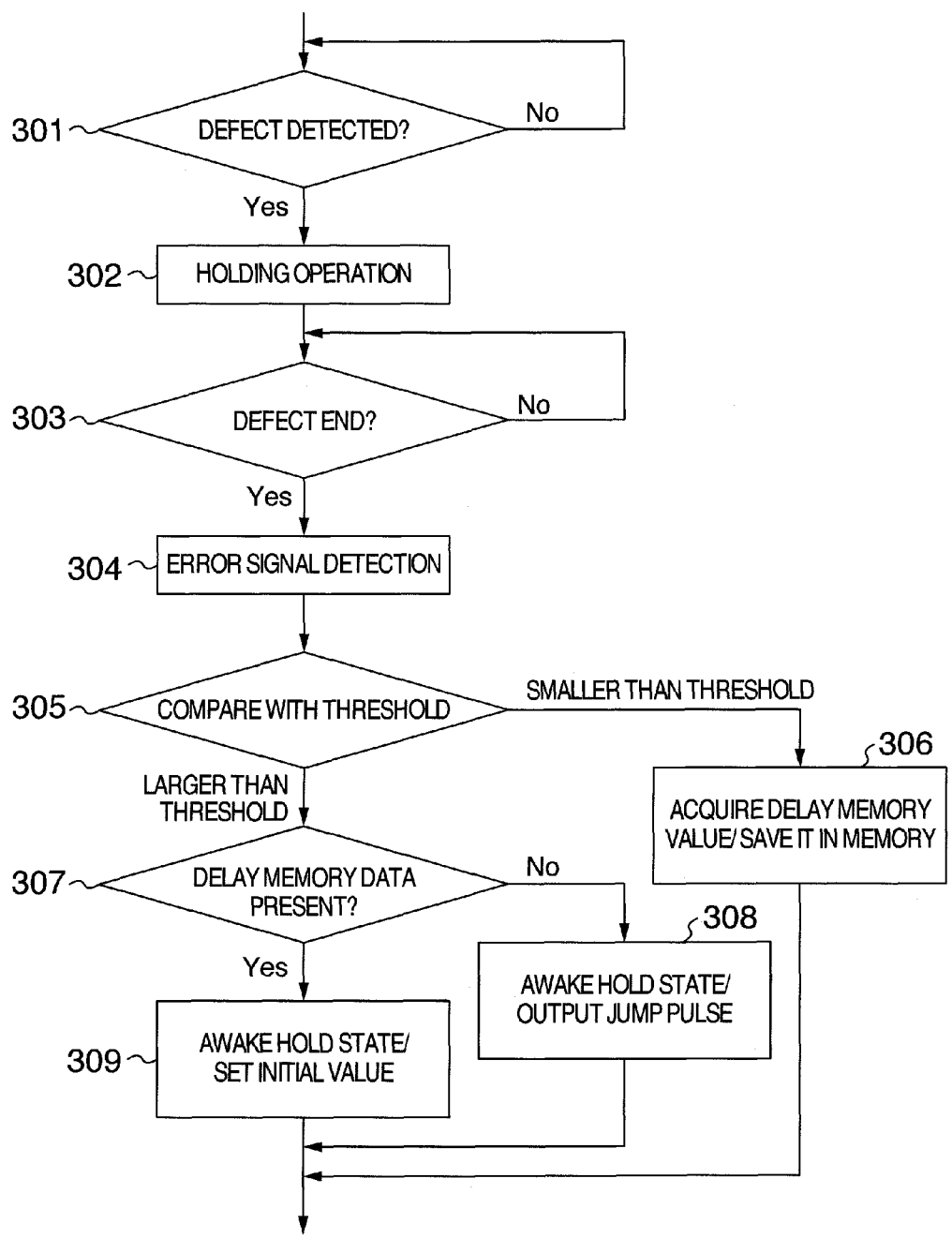
FIG. 10 is a flow chart for explaining system control operation in the embodiment 3.

FIG. 10 represents a sequence of operation of the system controller 27 in the present embodiment. The system controller detects a defect (step 301), sets the holding module at their hold state when detecting the defect (step 302), and waits for an end of the defect (step 303). When detecting the defect end, the system controller detects a level of an error signal (step 304), compares the detected signal with a threshold (step 305). The system controller acquires a value of the delay memory for a predetermined period when the detected signal is smaller than the threshold and stores the acquired value in the memory (step 306). The system controller detects presence or absence of data in the delay memory when the detected signal is larger than the threshold (step 307). In the absence of such data, the system controller outputs a position correction pulse (step 308), and in the presence of such data, the system controller sets an initial value for the HPF for phase compensation (step 309).

Although a feedback loop is closed after the end of the position correction pulse in the present embodiment, the present invention is not limited to this example. In other words, the position correction pulse may be added to the feedback control signal and then output by awaking the hold state of each holding module simultaneously with the output of the position correction pulse. Further, the holding module 14 and the holding module 21 may be arranged at the downstream stages of the HPF for low frequency component compensation and HPF for phase compensation independently of each other, the hold state of the holding module provided at the downstream stage of the HPF for phase compensation may be awaked simultaneously with the output of the position correction pulse, and the hold state of the holding module provided at the downstream stage of the HPF for low frequency component compensation may be awaked after the end of output of the position correction pulse.

The present invention is not restricted to the aforementioned embodiments but may be modified in various ways. For example, the aforementioned embodiments have been explained in detail only for easy understanding of the present invention, the present invention is not necessarily limited to having all the arrangements explained above. Further, part of the arrangement of one of the embodiments may be replaced with the arrangement of the other embodiment and the arrangement of the other arrangement may be added to the arrangement of one of the embodiments.

The invention claimed is:

1. An optical disc apparatus for performing data recording and/or reproducing operation by irradiating an optical disc with a laser beam, comprising:
    an objective lens configured to converge the laser beam directed to the optical disc to form an optical spot;
    a focus actuator configured to drive the objective lens toward a rotary shaft of the disc;
    a tracking actuator configured to drive the objective lens in a disc radius direction;
    a detector configured to convert light of the optical spot reflected by the optical disc to an electric signal;
    a focus error signal generating module configured to generate a focus error signal on a basis of an output of the detector;
    a tracking error signal generating module configured to generate a tracking error signal, on the basis of the output of the detector;
    a focus control module configured to include a first digital filter for generating a control signal to position the optical spot on a predetermined recording/reproducing surface, on the basis of an output of the focus error signal generating module;
    a tracking control module configured to include a second digital filter for generating a control signal to position the optical spot on a predetermined track, on the basis of an output of the tracking error signal generating module;
    a focus actuator driving module configured to drive the focus actuator on the basis of an output of the focus control module;
    a tracking actuator driving module configured to drive the tracking actuator on the basis of an output of the tracking control module;
    a defect detecting module configured to detect a defect on the optical disc; and
    a system controller configured to control the focus control module, the tracking control module and the defect detecting module;
    wherein the system controller is configured to hold an input or output of at least one of the focus control module and the tracking control module, and is configured to set an initial value in a delay memory of the digital filter provided in the held control module upon release of the hold state, on the basis of an output of the defect detecting module.

2. An optical disc apparatus according to claim 1,
    wherein the focus control module has a position/velocity detecting module configured to calculate a position of the optical spot and a moving velocity thereof after passage of the defect, on the basis of the output of the defect detecting module and the output of the focus error signal generating module; and
    wherein the system controller is configured to calculate an initial value to be set in the delay memory, on the basis of an output of the position/velocity detecting module.

3. An optical disc apparatus according to claim 2, wherein the position/velocity detecting module is configured to calculate an error and a velocity of the optical spot from a level and a rate of change of the focus error signal after passage of the defect, on the basis of the output of the defect detecting module and the output of the focus error signal generating module.

4. An optical disc apparatus according to claim 2,
    wherein the position/velocity detecting module is configured to calculate an error and a velocity of the optical spot from a level and a rate of change of the tracking error signal after passage of the defect, on the basis of the output of the defect detecting module and the output of the tracking error signal generating module.

5. An optical disc apparatus according to claim 1,
    wherein either one of the first digital filter or the second digital filter has a phase compensator and a low frequency component compensator; and
    wherein the system controller is configured to modify the value of the delay memory of the phase compensator.

6. An optical disc apparatus according to claim 1, wherein the system controller is configured to modify the value of the delay memory when a level of the focus error signal is outside of a predetermined range, and to not modify the value of the delay memory when the level of the focus error signal is in the predetermined range, on the basis of the output of the focus error signal generating module.

7. An optical disc apparatus according to claim 1, wherein the system controller is configured to store the value of the delay memory of the digital filter for a predetermined period after defect passage, on the basis of the output of the defect detecting module, and is configured to change the value of the delay memory based on the stored value when the focus error signal is outside of the predetermined range, on the basis of the output of the focus error signal generating module.

8. An optical disc apparatus according to claim 7,
    wherein the system controller has a record stop error range to stop a recording operation when a control target error is increased during the recording operation; and
    wherein a value of an error signal range for use in determining execution of modifying operation of the value of the delay memory is smaller than a value of the record stop error range.

9. An optical disc apparatus according to claim 1,
    wherein at least one of the first digital filter and the second digital filter has a phase compensator and a low frequency component compensator; and
    wherein the system controller is configured to set the value of the delay memory of the phase compensator upon awake of the hold state at zero, on the basis of the output of the defect detecting module.

10. An optical disc apparatus according to claim 1, wherein at least one of the focus control module and the tracking control module has a phase compensator and a low frequency component compensator in the digital filter; and wherein the system controller is configured to hold an input of the digital filter and an output of the low pass filter during detect of the defect, and is configured to set the value of the delay memory of the low frequency component compensator at zero upon awake of the hold state after end of the defect, on the basis of the output of the defect detecting module.

11. An optical disk apparatus according to claim 1, wherein the tracking control module has a position/velocity detecting module configured to calculate a position of the optical spot and a moving velocity thereof after passage of the defect, on the basis of the output of the defect detecting module and the output of the tracking error signal generating module; and wherein the system controller is configured to calculate an initial value to be set in the delay memory, on the basis of an output of the position/velocity detecting module.

12. An optical disc apparatus according to claim 1, wherein the system controller is configured to modify the value of the delay memory when a level of the tracking error signal is outside of a predetermined range, and to not modify the value of the delay memory when the level of the tracking error signal is in the predetermined range, on the basis of the output of the tracking error signal generating module.

13. An optical disc apparatus according to claim 1, wherein the system controller is configured to store the value of the delay memory of the digital filter for a predetermined period after defect passage, on the basis of the output of the defect detecting module, and is configured to change the value of the delay memory based on the stored value when the tracking error signal is outside of the predetermined range, on the basis of the output of the tracking error signal generating module.

* * * * *